United States Patent [19]
Pignerol

[11] Patent Number: 5,113,747
[45] Date of Patent: May 19, 1992

[54] HIGH PRESSURE PISTON SEALING SYSTEM AND METHOD OF ITS ASSEMBLY

[76] Inventor: Herve Y. Pignerol, 9 Les Adrets Du Pilon - LE Revest, 83 200 Toulon, France

[21] Appl. No.: 697,905

[22] Filed: May 1, 1991

Related U.S. Application Data

[63] Continuation of Ser. No. 566,327, Aug. 19, 1990, abandoned, which is a continuation of Ser. No. 300,610, Jan. 23, 1989, abandoned.

[51] Int. Cl.⁵ ............................................. F16J 9/00
[52] U.S. Cl. ........................................ 92/175; 92/250; 92/255; 92/256; 29/888.07; 277/165; 277/169; 277/188 A
[58] Field of Search ............... 277/169; 92/255, 256; 29/888.07

[56] References Cited

U.S. PATENT DOCUMENTS

| | | |
|---|---|---|
| 1,529,052 | 3/1925 | Anderson . |
| 2,349,170 | 5/1944 | Jackman ............................ 309/23 |
| 2,509,672 | 3/1947 | Christensen ...................... 277/165 |
| 2,563,853 | 8/1951 | Marien ............................. 309/44 |
| 2,862,736 | 9/1956 | Russell ........................... 277/188 A |
| 3,420,536 | 1/1969 | Grover ............................ 277/165 |
| 3,582,093 | 6/1971 | Lucien ............................. 277/177 |
| 3,990,712 | 11/1976 | Dechavanne ................... 277/165 |
| 4,067,584 | 1/1978 | Hunger ........................... 277/165 |
| 4,204,690 | 5/1980 | Holland et al. ................... 277/27 |
| 4,285,525 | 8/1981 | Held ................................ 277/12 |
| 4,484,512 | 11/1984 | Dechavanne ..................... 92/243 |
| 4,576,386 | 3/1986 | Benson et al. ................... 277/165 |
| 4,749,202 | 6/1988 | Bonomi ........................... 277/165 |

FOREIGN PATENT DOCUMENTS

| | | |
|---|---|---|
| 249662 | 2/1964 | Australia ............................. 277/165 |
| 2436969 | 7/1974 | Fed. Rep. of Germany . |
| 7714344 | 8/1978 | Netherlands ........................ 92/249 |
| 767858 | 2/1957 | United Kingdom .......... 277/188 A |
| 1307213 | 2/1973 | United Kingdom .............. 92/250 |

OTHER PUBLICATIONS

Sales Pamphlet SD 300-C, entitled "Radial Compression Piston Rings and Slydring Piston Bearings", Shamban Sealing Systems.

*Primary Examiner*—William A. Cushlinski, Jr.
*Assistant Examiner*—Scott W. Cummings
*Attorney, Agent, or Firm*—Arnold, White & Durkee

[57] ABSTRACT

The present invention relates to a high pressure piston sealing system. More particularly, the present invention relates to a sealing system adopted for rigorous marine applications which prevent or inhibit the use of a seal lubricant.

13 Claims, 1 Drawing Sheet

HIGH PRESSURE PISTON SEALING SYSTEM AND METHOD OF ITS ASSEMBLY

This is a continuation of copending application Ser. No. 07/556,327 filed on Aug. 8, 1990, now abandoned, which is a continuation of copending application(s) Ser. No. 07/300,610 filed on Jan. 23, 1989, now abandoned.

BACKGROUND OF THE INVENTION

1. Field of the Invention

The present invention generally relates to a high pressure piston sealing system. More specifically, the present invention relates to a sealing system adapted for rigorous marine applications which prevent or inhibit the use of a seal lubricant.

2. Description of the Prior Art

In a variety of applications incorporating the use of a piston or similar reciprocating member, it is necessary to establish a dynamic seal between the moving or reciprocating member and the stationary element to prevent the flow of gases or fluids therebetween. This need is particularly accentuated in applications where high pressures or high temperatures, e.g., rigorous conditions, are involved.

To establish such a seal, a variety of designs have evolved, such designs generally incorporating the use of an O-ring placed about the outer periphery of the reciprocating element. The use of an O-ring in rigorous, high speed applications, however, presents a number of disadvantages. In such applications, the seal is subjected to a variety of stresses as determined by such varying parameters as differential pressure, precompression of the O-ring, material and hardness of the O-ring, roughness of the bore in which the O-ring operates, relative speed by which the O-ring moves through the bore, and degradation factors via chemical agents, etc. Further, if the O-ring or similar elastic element is to function favorably, the clearance between the reciprocating elements must be reduced. This low tolerance between the reciprocating members in conjunction with one or more of the above mentioned factors) places the O-ring or elastic seal under considerable lateral friction, often causing the seal to "roll up" or tear.

To overcome this problem, a seal lubricant is often used, said lubricant applied to the interior of the bore, or to the O-ring itself. Such a lubricant, however, is not useful in applications where the sealing surface are exposured to the marine environment. In such cases, the lubricant will rapidly wash away in a few strokes of the reciprocating member.

A variety of seal designs have been developed to overcome the above referenced problems of tearing and rolling. In one design, the O-ring is disposed in a cavity or groove and fitted with a rigid cap ring over its contacting surface. Such a design is seen, for example, in U.S. Pat. No. 4,749,202. In other designs, especially those adapted for extreme high pressure applications, the combination O-ring and cap ring are laterally buttressed by the positioning of anti-extrusion rings. In such a design, the O-ring is protected both from direct frictional wear as well as from lateral forces common in applications involving a closely tolerenced reciprocating element.

Disadvantages with these designs include the special tooling necessary to position and remove the O-rings, buttressing or bearing rings and cap rings which have been positioned about the piston or other reciprocating element. The need for such tooling is especially non desirable when the sealing assembly must be quickly removed or replaced, e.g., on board a marine vessel.

A further disadvantage with such sealing systems includes the need to often machine the piston or other sealing element in multiple pieces so as to allow for the ready removal or replacement of the sealing elements. Some seal designs have also been developed to overcome this problem. However, these designs dictate the use of hot oils or other hot inert fluids to soften the sealing members so that they may be placed about the reciprocating element. This process is both time consuming and detrimentally effects the sealing properties of the elements.

SUMMARY OF THE INVENTION

The present invention addresses the above noted and other disadvantages of prior art sealing systems by providing a durable, high pressure sealing system. The sealing system described by the present invention does not require the use of special tooling during placement and replacement, and further allows single piece fabrication of the piston or reciprocating sealing element on which it is applied. Further, the present design is completely operable without the need for seal lubricants.

The present sealing system generally consists of an energized (i.e., compressed) elastic ring fitted into a specially designed retention groove of the piston. This retention groove is comprised of a higher and a lower step, the higher step being disposed between two grooves such as to form a pedestal.

The pedestal itself is provided with a curvilinear top surface to accommodate the outer diameter of the O-ring. Due to such a curvilinear sealing surface, maximum sealing surface area between the O-ring and the reciprocating element is maintained. When positioned atop the pedestal, the outer diameter of the O-ring closely approximates the outer diameter of the reciprocating element. In such a fashion, minimum deformation of the O-ring is required to secure it in place.

The grooves formed on either side of the pedestal accommodate bearing rings. These rings, when situated in their respective grooves, preferably form a guiding surface having an outer diameter which closely contacts the interior of the cylinder wall. When in place, the bearing rings form a secondary groove, the bottom of which is formed by the O-ring fitted atop the upper step or pedestal. This secondary groove accommodates a cap ring. Preferably, the combination cap ring and bearing rings form a flush, uniform sealing and guiding surface when positioned in place along the reciprocating element.

The present system has a number of advantages over the art. One such advantage is the enhanced wear life of the seal even under rigorous, high pressure applications.

A second advantage of the present design is the ease to which the system can be placed and replaced in position on the reciprocating element, without the need for special tooling or hot inert fluids.

Another advantage of the present system is the ability of the seal to function without the need for a seal lubricant.

Yet another advantage of the present invention is the ability of the seal to allow the assembly of a double piston made from one solid part and including, between the two pistons, a component with a smaller diameter than the bore in which the piston slides. This ability to utilize a single-part, double piston simplifies the design of such part while simultaneously reducing the cost of assembly while increasing reliability.

BRIEF DESCRIPTION OF THE DRAWINGS

An indicative embodiment of the invention will be herein described as based on the accompanying drawings; where.

DETAILED DESCRIPTION OF THE DRAWINGS

Figure 1:
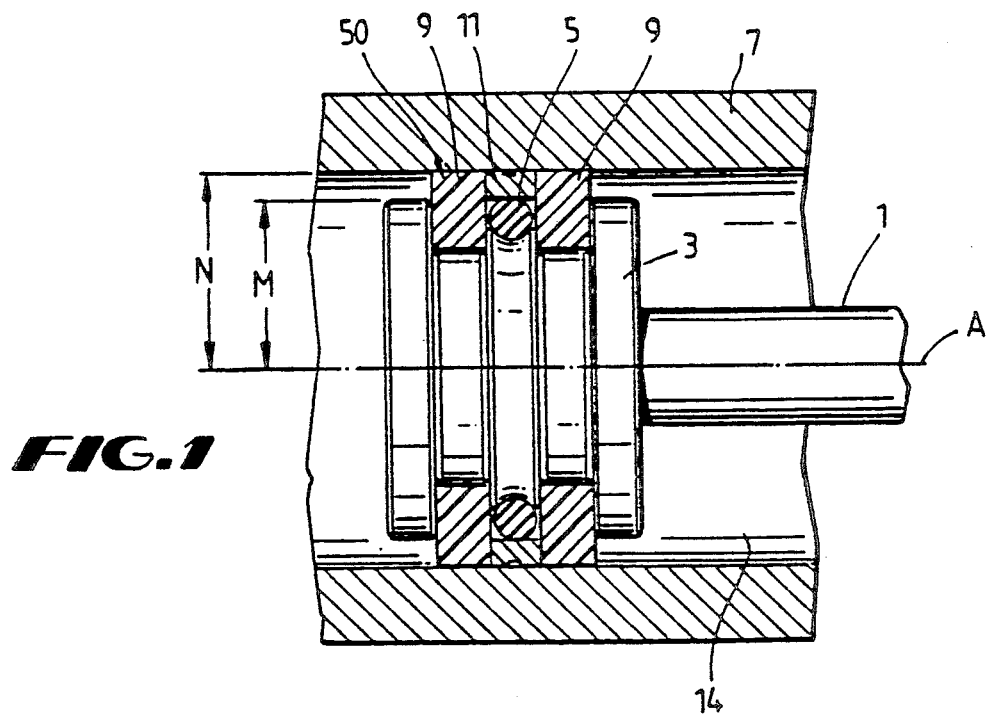
FIG. 1 illustrates a side view of the sealing systems in relation to a cylinder bore.

FIG. 1 generally illustrates a preferred embodiment of the present invention. In FIG. 1, a piston 3 is slidably fitted within a cylindrical bore 14 formed within a stationary member 7, said piston 3 being movable via a piston rod 1 which, in turn, is operably coupled to an actuation means or the like (not shown).

The sealing system itself comprises a piston head 3 which has been milled, cast, or turned to define a three-tiered primary groove 18. Groove 18 may be best seen by reference to FIG. 2. Groove 18 generally comprises an interior tier or pedestal member 22 disposed between two secondary or bearing grooves 20. As shown, pedestal 22 describes a raised surface in relation to grooves 20. Preferably, secondary or bearing grooves 20 are of substantially equal depth and width to accommodate a uniform bearing ring 9, as will be further discussed herein.

Figure 2:
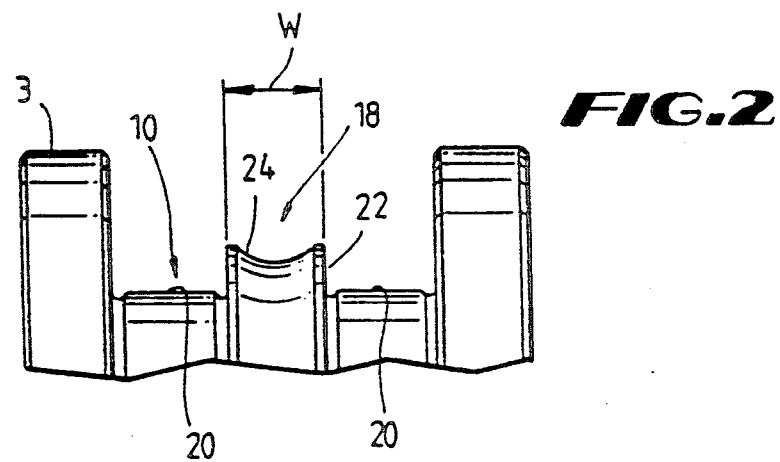
FIG. 2 illustrates a detailed side view of the piston component of the sealing system.
Figure 3:
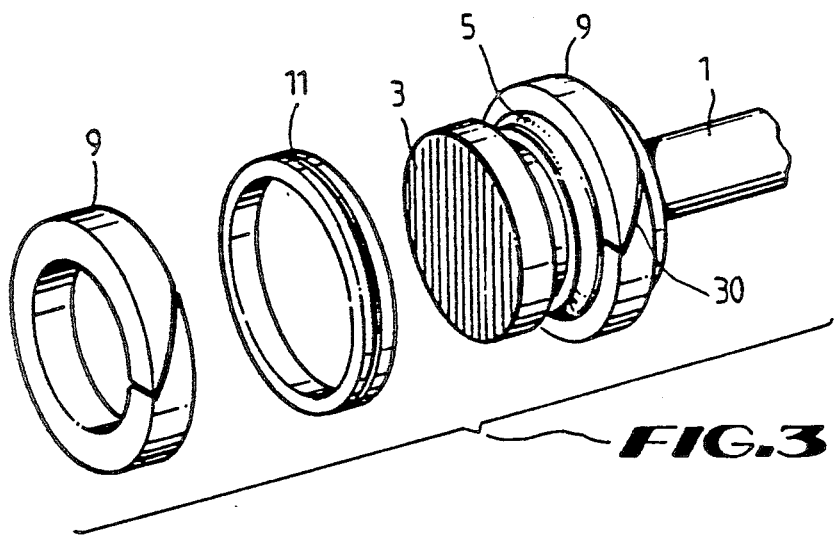
FIG. 3 illustrates an exploded, perspective view of the sealing system.

Referring to FIGS. 1 and 2, pedestal 22 is designed to accommodate an O-ring 5 of a desired diameter D. In such a fashion, the minimum width W of pedestal 22 is somewhat determined by this diameter D. Preferably, pedestal 22 defines a curvilinear upper sealing surface 24, the arc of said curve determined by the diameter D of the O-ring 5. Use of such a curved upper surface 24 increases the contact surface between the O-ring 5 and the pedestal 22 and hence enhances the sealing effect between the piston 3 and the O-ring 5.

Sealing pedestal 22 is adapted to receive an O-ring of a prescribed diameter D so as to enhance a favorable seal between ring 5 and pedestal 22 upon insertion in bore 14. Preferably, the combination pedestal 22 and O-ring 5 describe a sealing surface with a maximum radius substantially equal to the radius M of the piston as measured from axis A.

To provide topical support and wear resistance to O-ring 5, a slot-free cap ring 11 is provided to complete the sealing system, said ring sized to fit between bearing rings 9 and over O-ring 5 to form a tight flush sealing surface with the stationary member 7 as illustrated in FIG. 1. Preferably, this sealing surface has a uniform radius N as measured from axis A so as to ensure favorable sealing properties in bore 14.

It is contemplated that the O-ring adapted for use in the present system is of generally conventional design. However, other specialized designs for the O-ring may be used commensurate with desired sealing needs in the bore 14. The O-ring 5 is preferably comprised of urethane or bunan. Such a material is compressed to form the O-ring, but is yet sufficiently elastic to be stretched over the piston head 3 during assembly. The bearing and cap rings are preferably comprised of nylon and polyethylene, respectively. Such material is generally not sufficiently elastic under room temperatures to allow deformation of the rings for placement on piston 3. To allow for placement about piston 3, bearing 9 are preferably provided with an angled slot 30 or the like to allow placement of the rings in their respective grooves about piston 3. In such a fashion, a conventional screwdriver or other similar tool may be introduced into the slot 30 to pry the ring 9 out of the groove 20 when removal or replacement is desired.

The assembly of the present system about the reciprocating is conducted as follows, though other assembly steps are envisioned. Beginning at the end of the sealing surface or groove 18 nearest the connecting rod 1, one bearing ring 9 is deformed about slot 30 and positioned in its respective groove 20. As noted, this is accomplished by widening the slot 30 by hand so that the inner diameter of ring 9 is such as to allow placement over the piston head 3. The O-ring 5 is next positioned on the curvilinear surface 24 defining the upper portion of pedestal 22. The cap ring 11 is then positioned on top of O-ring 5. Finally, the second bearing ring 9 is fitted into its respective groove in the same manner earlier described, completing the sealing system. The resulting system now has a smooth, flush sealing and guiding surface.

What is claimed is:

1. A high pressure sealing system comprising:
   a cylinder having a bore of a preselected diameter extending therethrough and defining an axially extending chamber with a slide surface;
   a piston having a diameter less than the diameter of said cylinder bore and being adapted for axial movement within said chamber, said piston having a primary annular groove of a diameter less than said diameter of said piston, said primary annular groove having a stepped annular surface of a preselected diameter and axial width located in said primary annular groove to define a raised annular surface disposed between two secondary annular grooves;
   an elastic ring disposed in said primary annular groove about and in sealing contact with said raised annular surface;
   at least two bearing rings having an outer surface adapted for engagement with said sliding surface of said chamber, said outer surfaces of said bearing rings having a diameter substantially similar to the diameter of said cylinder bore, and said bearing rings having an inner surface of a diameter less than both the diameter of said piston and the diameter of said raised annular surface, whereby said bearing rings are retained in said secondary annular grooves, said bearing rings being disposed immediately adjacent said elastic ring in contacting relation thereto and forming a third annular groove therebetween; and
   a cup ring having an inner surface of a diameter greater than the diameter of said piston and an outer surface of a diameter substantially similar to the diameter of said cylinder bore, said cap ring being positioned over said elastic ring and disposed in the third annular groove formed between said bearing rings, said cap ring outer surface being adapted to sealingly contact said slide surface of said chamber and said cap ring inner surface being adapted to sealingly contact said elastic ring.

2. The high pressure sealing system of claim 1 wherein said raised surface is provided with a curvilinear upper sealing surface to accommodate said elastic ring.

3. The high pressure sealing system of claim 1 wherein the elastic ring in combination with the raised surface defines an outer diameter substantially equal to the outer diameter of the piston.

4. A high pressure sealing system, as set forth in claim 1, wherein said bearing rings define a passage extending therethrough to form first and second annular end portions circumferentially spaced apart to permit radial expansion of said bearing rings by increasing the circumferential spacing therebetween.

5. A high pressure sealing system, as set forth in claim 4, wherein said bearing rings have first and second axial end portions and said passage extends between the first and second axial end portions along a line that intersects circumferential displaced points on said first and second axial end portions so that the first and second portions circumferentially overlap.

6. A high pressure sealing system comprising:
   a stationary member having a bore of a preselected diameter disposed therethrough, said bore defining an axially extending chamber with a slide surface;
   a piston having a diameter less than the diameter of said cylinder bore and being adapted for axial movement within said chamber across said slide surface, said piston having a primary annular groove disposed therein, said primary annular groove having a diameter less than the piston diameter and a stepped annular surface of a preselected diameter and axial width located within said primary annular groove to define a raised surface between two second annular grooves;
   an elastic, precompressed ring disposed in said primary annular groove about and in sealing contact with said raised surface;
   at least two bearing rings having an outer surface adapted for engagement with said sliding surface of said chamber, said outer surfaces of said bearing rings having a diameter substantially similar to the diameter of said cylinder bore, and said bearing rings having an inner surface of a diameter less than both the diameter of said piston and the diameter of said raised annular surface, whereby said bearing rings are retained in said secondary annular grooves, said bearing rings being disposed immediately adjacent said elastic ring in contacting relation thereto and forming a third annular groove therebetween; and
   a cap ring having an inner surface of a diameter greater than the diameter of said piston and an outer surface of a diameter substantially similar to the diameter of said cylinder bore, said cap ring being positioned over said elastic ring and disposed in the third annular groove formed between said bearing rings, said cap ring outer surface being adapted to sealingly contact said slide surface of said chamber and said cap ring inner surface being adapted to sealingly contact said elastic ring.

7. The high pressure sealing system of claim 6 wherein said raised surface is provided with a curvilinear upper sealing surface.

8. The high pressure sealing system of claim 7 wherein said curvilinear sealing surface describes an arc substantially similar to that of the elastic ring.

9. The high pressure sealing system of claim 8 wherein the elastic ring, in combination with the raised surface, defines an outer diameter substantially equal to the outer diameter of the piston.

10. A high pressure sealing system, as set forth in claim 4, wherein said bearing rings define a passage extending therethrough to from first and second annular end portions circumferentially spaced apart to permit radial expansion of said bearing rings by increasing the circumferential spacing therebetween.

11. A high pressure sealing system, as set forth in claim 10, wherein said bearing rings have first and second axial end portions and said passage extends between the first and second axial end portions along a line that intersects circumferential displaced points on said first and second axial end portions so that the first and second portions circumferentially overlap.

12. A method for assembling a high pressure sealing system that includes a cylinder having a bore of a preselected diameter extending therethrough, a piston of a diameter less than the cylinder bore diameter and having a primary annular groove formed therein by a pair of secondary annular grooves positioned on opposite sides of a raised annular surface, the raised annular surface having a diameter less than the piston diameter and greater than the secondary groove diameters, first and second bearing rings having an outer diameter substantially similar to the cylinder bore diameter and an inner diameter less than the raised annular surface diameter, an elastic ring, and a cap ring having an internal diameter greater than the piston diameter and an outer diameter substantially similar to the cylinder bore diameter, the method comprising the steps of:
   radially expanding the first bearing ring over said piston diameter;
   inserting said radially expanded first bearing ring into a first one of said secondary annular grooves;
   expanding said elastic ring over said piston outer diameter;
   inserting said elastic ring into said primary annular groove about said raised annular surface and in axial contact with the first bearing ring;
   placing said cap ring over and in sealing contact with said elastic ring;
   radially expanding the second bearing ring over said piston diameter;
   inserting said radially expanded second bearing ring into a second one of said secondary annular grooves in axial contact with the elastic ring; and
   inserting said piston, bearing rings, elastic ring, and cap ring, as an assembled unit, into said cylinder bore with the outer surface of said cap ring in sealing contact with said cylinder bore.

13. A method, as set forth in claim 12, wherein said first and second bearing rings are of a split-ring configuration having first and second adjacent end portions and the steps of radially expanding said bearing rings include displacing the first and second end portions of said bearing rings to increase the circumferential spacing therebetween.

* * * * *